United States Patent
Watanabe et al.

[11] Patent Number: 6,106,975
[45] Date of Patent: *Aug. 22, 2000

[54] BATTERY WITH TABS HAVING SUPERIMPOSED BUNDLING MEMBERS

[75] Inventors: Goro Watanabe, Tajimi; Kenichi Suzuki, Nagoya, both of Japan

[73] Assignee: Kabushiki Kaisha Toyota Chuo Kenkyusho, Aichi-gun, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/048,001

[22] Filed: Mar. 26, 1998

[30] Foreign Application Priority Data

Mar. 26, 1997 [JP] Japan ................................ 9-073958
Sep. 2, 1997 [JP] Japan ................................ 9-237480

[51] Int. Cl.$^7$ ........................................... H01M 4/02
[52] U.S. Cl. ..................... 429/211; 429/209; 429/121; 429/122
[58] Field of Search ........................ 429/211, 209, 429/121, 122

[56] References Cited

U.S. PATENT DOCUMENTS

| | | | |
|---|---|---|---|
| 4,997,732 | 3/1991 | Austin et al. | 429/153 |
| 5,326,653 | 7/1994 | Chang | 429/162 |
| 5,368,958 | 11/1994 | Hirai et al. | 429/211 |
| 5,456,813 | 10/1995 | Grange-Cossou et al. | 204/284 |
| 5,837,396 | 11/1998 | Han | 429/94 |
| 5,871,861 | 2/1999 | Hirokou et al. | 429/149 |

FOREIGN PATENT DOCUMENTS

| | | | |
|---|---|---|---|
| 1-187761 | 7/1989 | Japan | H01M 02/22 |
| 3-272565 | 7/1989 | Japan | H01M 4/64 |
| 9-92335 | 4/1997 | Japan . | |
| 9-92338 | 4/1997 | Japan . | |

*Primary Examiner*—Maria Nuzzolillo
*Assistant Examiner*—Raymond Alejandro
*Attorney, Agent, or Firm*—Oblon, Spivak, McClelland, Maier & Neustadt, P.C.

[57] ABSTRACT

A battery includes a cathode, and an anode. At least one of the cathode and anode includes an electricity collector, a plurality of tabs, and an active material formed on the surface of the electricity collector. One end of the tabs projects from one side of the electricity collector. The electricity collector is laminated so as to make a flush end surface on the side from which the tabs project. The tabs are bonded integrally with the electricity collector, and each tab has a linkage member, and a bundling member. The linkage member projects from the side of the electricity collector. The bundling member is formed integrally with the linkage member, extends along the side of the electricity collector, is superimposed on other bundling member of the tab in a lamination direction of the laminated electricity collector, and is bonded integrally with other bundling member of the tab. In the thus constructed battery, the projection of the tabs are kept down to the width of the tab. As a result, it is possible to minimize the space required for integrally bonding the tabs, and to thereby enhance the energy density of the battery.

13 Claims, 12 Drawing Sheets

NO POSITIONAL FLUCTUATION ($\theta \approx 0°$)

$L \approx D/4$

MAX. POSITIONAL FLUCTUATION ($\theta \approx 360°$)

$L \approx \pi D/2$ (a) (b) (c)

COATED PORTION

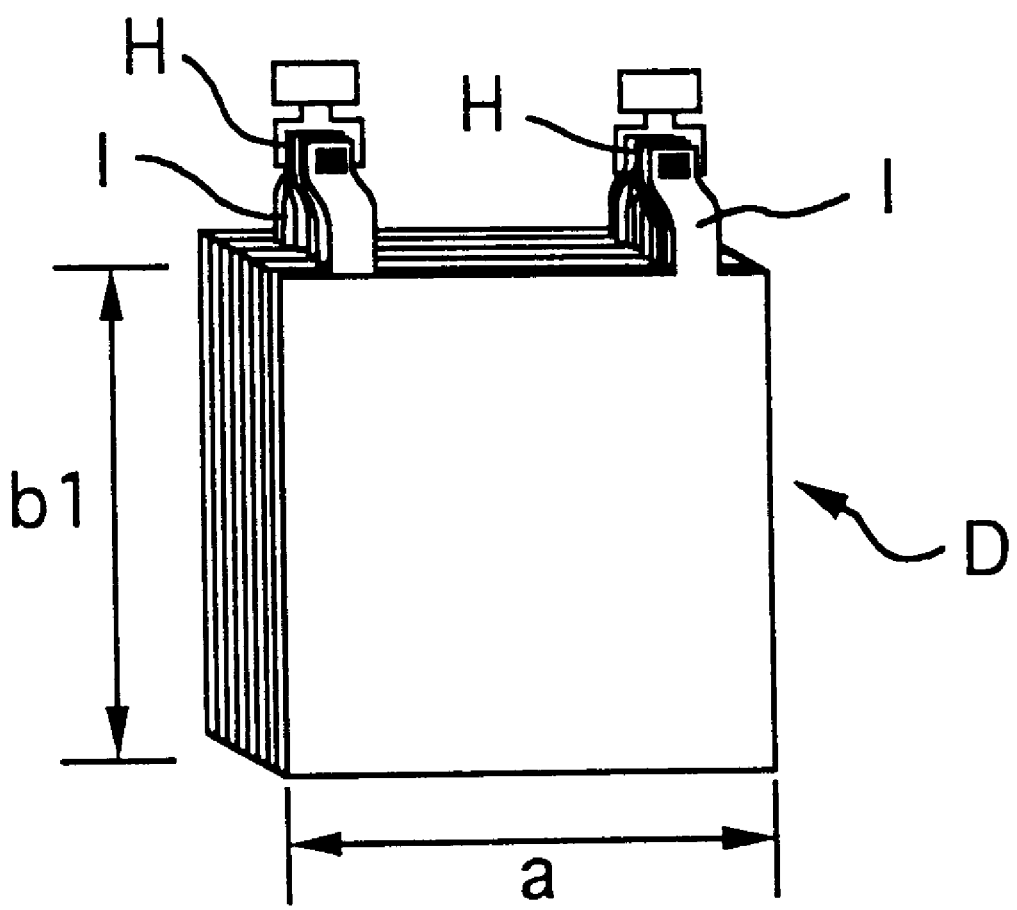

BATTERY WITH TABS HAVING SUPERIMPOSED BUNDLING MEMBERS

BACKGROUND OF THE INVENTION

1. Field of the Invention

The present invention relates to a battery which comprises an electricity generator element. Particularly, it relates to an electricity generator element in which an electricity collector is kept in a laminated state. The electricity collector is coated with an active material on the surface, and a plurality of tabs for taking out a generated current project from the electricity collector. More particularly, it relates to the reduction of the space required for gathering and integrating the tabs so that the resulting battery can be compact and exhibit high performance.

2. Description of the Related Art

The following batteries are known to be made by bonding current-taking-out tabs to an electricity collector which constitutes an electrode: a laminated square-shaped battery in which a plurality of square-shaped electricity collectors are laminated; a spiral lithium battery or a cylinder-shaped Ni—Cd battery in which a band-shaped electricity collector is wound. For instance, the spiral lithium battery is constructed as follows: a cathode employed by the spiral lithium battery is made by coating a band-shaped electricity collector with a cathode active material; then, a plurality of current-taking-out tabs are bonded to a part of the resulting cathode; further, a band-shaped anode is superimposed on the thus prepared cathode by way of a separator, and they are wound integrally in a spiral manner; and the thus prepared spiral electricity generator element is finally accommodated in a cylinder-shaped battery container. Concerning the method for bonding the tabs to the cathode(or to the electrode in general), the ultrasonic welding, the resistance welding and the crimping are employed.

In a small-sized battery whose current capacity is about 1 Ah, a tab is made by using a metallic foil which has a thickness of a couple dozens of micrometers and a width of a few millimeters. The tab is attached to each of the cathode and anode in a quantity of 1 at least. A current of about a couple of amperes flows in each of the tabs when the small-sized battery is discharged or recharged. The tab can be attached at a leading end of the wound band-shaped electrodes, or at a terminal end thereof, or even at a central portion thereof.

A relatively large-sized battery whose current capacity is, for example, from a couple dozens to a couple hundreds of ampere-hours fundamentally has the same construction as that of the small-sized battery. Since, a band-shaped electrode is formed as a long and continuous substance and has a large surface area, there is a great difference in that it is necessary to attach a plurality of tabs entirely over the electrodes at predetermined intervals so that the discharge and recharge take place entirely over the electrodes without loss, and evenly. When the large-sized battery is provided with a plurality of the tabs, the bonding portions of the tabs have a complicated structure, for instance, as illustrated in FIG. 21. In the large-sized battery of the drawing, a band-shaped cathode "A" and a band-shaped anode "B" are wound by way of separators "C1" and "C2", respectively, as illustrated in FIG. 22. Accordingly, an electricity generator element "D" is made by superimposing the cathode "A" and the anode "B" in a spiral manner. The electricity generator element "D" is then accommodated in a battery container "E" as illustrated in FIG. 21. The cathode "A", and the anode "B" are provided with a couple dozens of tabs "F" as illustrated in FIG. 22. In many cases, the thickness of the tabs "F" is dependent on the thickness of the cathode or anode active material. For example, the thickness of the tabs "F" is from a couple dozens to a few hundreds of micrometers. Generally speaking, the tabs "F" are formed as a thin plate shape at least at the attached portion, and are formed as a complicated ribbon-like shape at the portion projecting from the electricity collector (i.e., the cathode "A" and the anode "B", or the electricity generator element "D").

When winding a band-shaped electrode which is provided with a plurality of the tabs at equal intervals, however, the tabs are projected extremely randomly as illustrated in FIG. 5, thereby making it difficult to bond them together to be integrated. Accordingly, one may think of displacing the tabs by a small distance back and forth from the positions which are disposed at equal intervals. By thus displacing the tabs, it is possible, in calculation, to project the tabs from the aligned positions as illustrated in FIG. 23. When the projected tabs are aligned, it is easy to bond the aligned tabs integrally to form a complete terminal "G" as illustrated in FIG. 24. In actual winding processes, however, the tabs cannot be aligned in the second half of the winding processes, though they can be aligned in the first half of the winding processes. The disadvantage results from the fact that the band-shaped electrode is tightened by winding to differently wound states in every turn of winding in the second half of the winding processes. Thus, it is actually difficult to align the tabs. In the actual winding processes, the positions of the tabs fluctuate in a range of about 45 degrees of sector angle. A space of from about 20 to 30 mm in height is required to integrate the thus disaligned tabs.

Whilst, there are indexes for rating the performance of a battery, such as the energy per unit weight (Wh/g) and the energy per unit volume (Wh/cm$^3$). When a battery is limited in terms of the overall size, the extra spaces, such as the space for bonding and integrating the tabs, should be removed as much as possible in order to upgrade the energy-density indexes. When the tabs are connected by conventional techniques, the tabs are connected complicatedly to take up extra space, thereby reducing the area of electrodes. Consequently, it is difficult to reduce the extra spaces and to provide high performance for batteries.

The same problems exist in the laminated square-shaped battery. FIG. 25 illustrates the construction of the laminated square-shaped battery. In the battery, the electrodes, namely, a cathode "A" and an anode "B" are formed in a square shape. A number of the cathodes "A" and anodes "B" are laminated in layers by way of separators "C" to make an electricity generator element "D". A plurality of tabs "F" are projected from one of the sides of the cathodes "A" and anodes "B", and are superimposed lamellarly. When the thus laminated tabs "F" are integrated, the tabs "F" are bonded at the leading ends "H" as illustrated in FIG. 27. Although the portions "I" of the tabs "F", which project from the electricity collector, are not formed as complicatedly as the ribbon-like shape in the spiral lithium battery shown in FIG. 21, they require a space in proportion to the number of the laminations of the cathodes "A" and anodes "B".

SUMMARY OF THE INVENTION

It is therefore an object of the present invention to provide a novel battery, which realizes the reduction of battery-container volume and the improvement in battery-energy density by controlling the space required for integrating the tabs down to the width of the tabs.

In order to carry out the object, the inventors of the present invention made a series of researches and developments. As mentioned earlier, a tab is projected from a band-shaped electricity collector, which constitutes an electrode. Hence, the inventors thought of a tab which comprises a linkage member and a bundling member. The linkage member is bonded to the electricity collector at one end. The bundling member extends from the linkage member, and is bonded together with other bundling members of other tabs. When the bundling member is formed so as to extend in a longitudinal direction of the electricity collector, the inventors noticed that the space required for the bonded bundling members could be reduced. The inventors thus confirmed that the problems associated with the conventional batteries could be solved, and accordingly they completed the present invention.

In an aspect of the present invention, a battery comprises:
 a cathode; and
 an anode;
 at least one of the cathode and anode including:
  an electricity collector having a side and a surface;
  a plurality of tabs having an end projecting from the side of the electricity collector, and being bonded integrally with the electricity collector; and
  an active material formed on the surface of the electricity collector;
  the electricity collector being laminated so as to make an end surface of flush on the side of the electricity collector; and
  the plurality of tabs having:
   a linkage member projecting from the side of the electricity collector; and
   a bundling member being formed integrally with the linkage member, extending along the side of the electricity collector, being superimposed on each other, and being bonded integrally with each other in a lamination direction of the laminated electricity collector.

In the thus constructed present battery, the bundling members of the tabs are superimposed and bonded integrally in the lamination direction of the spirally wound electricity collector. Accordingly, it is possible to reduce the space required for the integrally bonded tabs, which project from the electricity collector, and to readily bond the bundling members even when the tabs are disposed at various positions.

The present battery can be modified to include the following constructions which are presented herein as preferred forms of the present invention.

For instance, in accordance with a further aspect of the present invention, at least one of the cathode and anode can include a band-shaped electricity collector, a plurality of tabs, and an active material formed on the surface of the band-shaped electricity collector; the plurality of tabs can be disposed at predetermined intervals in a longitudinal direction of the band-shaped electricity collector; and the band-shaped electricity collector can be laminated by winding itself spirally so that the side of the band-shaped electricity collector results in a flush wound end surface.

In accordance with a further aspect of the present invention, at least one of the cathode and anode can include an electricity collector which is divided into a plurality of parts having an outer periphery, a plurality of tabs, and an active material formed on the surface of the electricity collectors; the plurality of tabs can project from the outer periphery of the parts; and the plurality of the parts can be formed in other than a band shape, and can be laminated so that the outer periphery of the electricity collectors results in a flush laminated end surface.

In accordance with a further aspect of the present invention, the plurality of tabs can be superimposed on each other at two or more positions, which are divided into groups of two or more, in the lamination direction of the electricity collector. By thus projecting the tabs at different positions, the number of the tabs can be increased with ease when the number of the laminated electricity collectors should be increased.

In accordance with a further aspect of the present invention, the plurality of tabs can be formed as a band shape; and the linkage member and the bundling member can be formed by bending. With this arrangement, the tabs having the bundling member of a predetermined length can be formed by bending, an operation which can be carried out with ease.

In accordance with a further aspect of the present invention, the plurality of tabs can be made by using a letter "L"-shaped tab foil. With this arrangement, the tabs can be provided for the electricity collector by simply carrying out a bonding process.

In accordance with a further aspect of the present invention, the plurality of tabs can be made from a comb-like sheet, wherein: the comb-like sheet includes a linkage band in which the linkage member is arranged in line in a longitudinal direction thereof, and a plurality of bundling bands which are formed integrally with the linkage band, which are disposed at predetermined intervals, which extend from the linkage band in a direction crossing the longitudinal direction of the linkage band, and which are made into the bundling member by cutting the linkage band off from the comb-like sheet. With this arrangement, the tabs can be fed continuously onto the electricity collector when carrying out a bonding process.

The further aspect of the present invention can be furthermore modified so that the comb-like sheet can be made by punching out a square-shaped sheet or by cutting a square-shaped sheet with an energy beam, thereby making two pieces of the comb-like sheets which are used independently as the comb-like sheet.

In a further aspect of the present invention, the plurality of tabs can be formed of a part of the side of the electricity collector by slitting the side. With this arrangement, it is not needed to prepare blanks which are specifically directed to making the tabs.

In a further aspect of the present invention, the plurality of tabs can be formed of: a remaining portion, after removing a portion formed by transverse slits which are slit in the side of the electricity collector in a transverse direction thereof at predetermined intervals, and slits with a predetermined width which are made continuously from the transverse slits and disposed along the side of the electricity collector. With this arrangement, there arises little portion to be cut off or removed in the side of the electricity collector.

In a further aspect of the present invention, both of the cathode and anode can include a band-shaped electricity collector, a plurality of tabs, and an active material formed on the surface of the band-shaped electricity collector; the tabs can be disposed at predetermined intervals in a longitudinal direction of the band-shaped electricity collector; and the tabs of the cathode, and the tabs of the anode can be projected from opposite sides of the band-shaped electricity collectors with respect to an axial direction thereof, respectively.

In a further aspect of the present invention, both of the cathode and anode can include a band-shaped electricity collector, a plurality of tabs, and an active material formed on the surface of the electricity collector; the tabs can be disposed at predetermined intervals in a longitudinal direction of the band-shaped electricity collector; and the tabs of the cathode, and the tabs of the anode can be projected from one and the same side of the electricity collectors with respect to an axial direction thereof.

As described so far, the present invention can keep the projection of the tabs, which project from the spiral or laminated electricity collector, down to the width of the tab. As a result, the space required for integrally bonding the tabs in the battery container can be reduced, and thereby the energy density of the resulting present battery can be enhanced.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 27 is an explanatory diagram which illustrates how tabs are bonded in the conventional laminated square-shaped battery of FIG. 25.

DETAILED DESCRIPTION OF THE PREFERRED EMBODIMENTS

Figure 1:
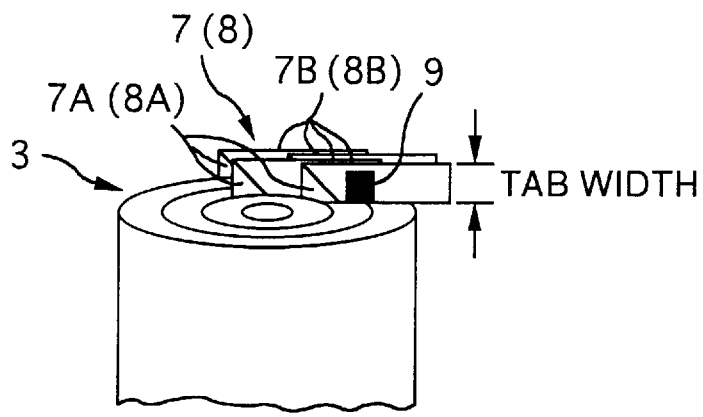
FIG. 1 is an explanatory diagram which illustrates the essence of the present invention at most.

Having generally described the present invention, a further understanding can be obtained by reference to the specific preferred embodiments which are provided herein for purposes of illustration only and are not intended to limit the scope of the appended claims.

An embodiment of a battery according to the present invention can be constructed in the following manner: at least one of a cathode and an anode includes a band-shaped electricity collector, a plurality of tabs, and an active material; the tabs are disposed at predetermined intervals in a longitudinal direction of the electricity collector, and include an end which projects from the side of the electricity collector; the active material is formed on the surface of the electricity collector; the electricity collector is wound spirally; and the tabs are bonded integrally.

The electricity collector for the cathode can be made of a metallic foil, and can be formed as a band shape. The metallic foil can be made from a raw material, such as aluminum, etc.

The active material for the cathode can be a mixture of a powder of lithium oxide, a powder of a conductor agent and a binder agent. The lithium oxide can be lithium cobaltnate, etc. The mixture can be turned into a paste-like substance, and the electricity collector for the cathode can be coated with the paste-like mixture.

The electricity collector for the anode can be made of a metallic foil, and can be formed as a band shape. The metallic foil can be made from a raw material, such as copper, etc.

The active material for the anode can be a mixture of a powder of carbon and a binder agent. The mixture can be turned into a paste-like substance, and the electricity collector for the anode can be coated with the paste-like mixture.

The tab for the cathode or anode can be made of the same metallic foil as that of the electricity collector for the cathode or anode, respectively. Alternatively, the tab can be made of a metallic foil, such as a nickel foil, etc. Further, the tab includes the linkage member, and the bundling member. The linkage member projects from one side of the electricity collector. The bundling member is formed integrally with the linkage member, and extends along the side of the electricity collector. The linkage member and the bundling member can be formed by bending a foil ribbon. Accordingly, a plurality of the resulting bundling members can be superimposed in a radial direction of the spirally wound electricity collector, and can be bonded integrally.

Another embodiment of a battery according to the present invention can be constructed in the following manner: at least one of a cathode and an anode includes a rectangle-shaped electricity collector, a plurality of tabs, and an active material; the tabs include an end which projects from the side of the electricity collector; the active material is formed on the surface of the electricity collector; and a plurality of the electricity collectors are laminated so as to make the end surface of the side of the electricity collectors flush. Note that the rectangular shape, or a square shape is one of the forms other than a band shape.

The tab can be formed of a letter "L"-shaped member. The long side of the letter "L"-shaped member can be made into the bundling member. The short side of the letter "L"-shaped member can be made into the linkage member.

Moreover, the tab can be made of a part of the side of the electricity collector by slitting the side of the electricity collector.

Hereinafter, preferred embodiments of a battery according to the present invention will be hereinafter described in detail by reference to the accompanied drawings.

First Preferred Embodiment

Figure 2:
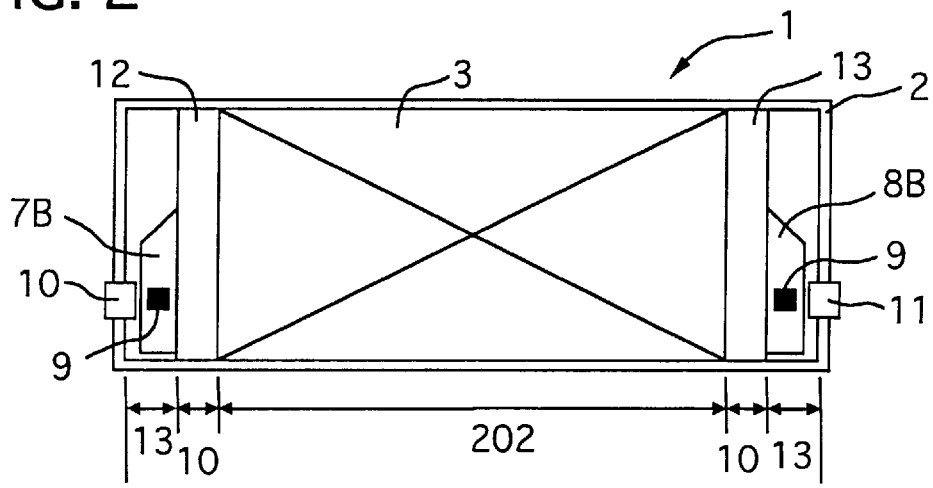
FIG. 2 is a constructional diagram which illustrates a First Preferred Embodiment of a battery according to the present invention.
Figure 3:
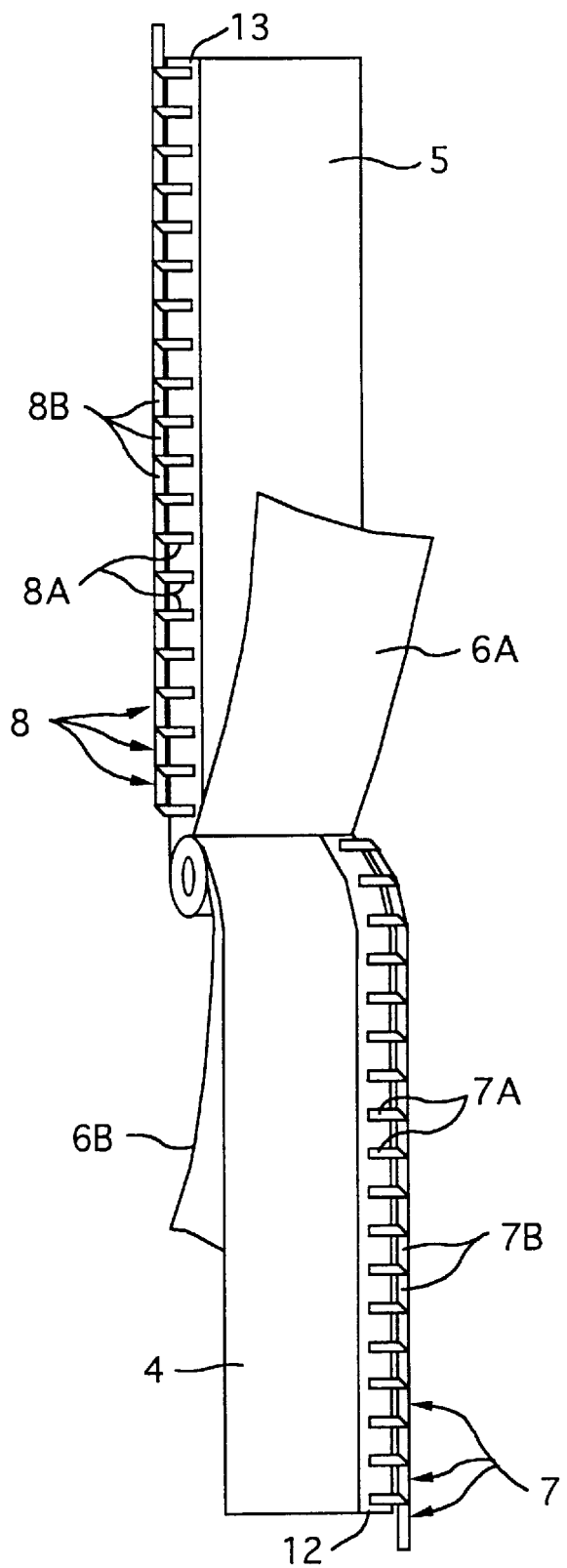
FIG. 3 is a conceptional diagram which illustrates how tabs are bonded and bent in accordance with the present invention and how a cathode and an anode are processed in the midst of their winding.

As illustrated in FIG. 2, a First Preferred Embodiment of a battery 1 according to the present invention is constructed by accommodating an electricity generator element 3 in a cylinder-shaped battery container 2, for example. As illustrated in FIG. 3, the electricity generator element 3 comprises a band-shaped cathode 4 and a band-shaped anode 5 which are wound spirally by way of separators 6A and 6B, and are superimposed accordingly. The band-shaped cathode 4 and anode 5 has a length of from a few meters to more than 10 m.

The cathode 4 includes a band-shaped electricity collector, a plurality of tabs 7, and a cathode active material. The tabs 7 are disposed at predetermined intervals in a longitudinal direction of the electricity collector, and one end of the tabs 7 is bonded to one of the sides of the electricity collector. The other end is projected from the side of the electricity collector. The surface of the cathode 4 is coated with the cathode active material.

Except that a plurality of tabs 8 are disposed on the opposite side of an electricity collector with respect to the side of the electricity collector of the cathode 4 from which the tabs 7 project, the anode 5 has the same construction as that of the cathode 4.

The electricity collector for the cathode 4 is made of a band-shaped metallic foil. The metallic foil is made from a raw material, for instance, aluminum. The cathode active material is a mixture of a powder of lithium oxide, a powder of a conductor agent and a binder agent. The mixture is turned into a paste-like substance, and the electricity collector for the cathode 4 is coated with the paste-like mixture.

The electricity collector for the anode 5 is made of a band-shaped metallic foil. The metallic foil is made from a raw material, for instance, copper. The anode active material is a mixture of a powder of carbon and a binder agent. The mixture is turned into a paste-like substance, and the electricity collector for the anode 5 is coated with the paste-like mixture.

The tabs 7 and 8 can be made of the same metallic foil as that of the electricity collector for the cathode 4 or anode 5, respectively. Alternatively, both of the tabs 7 and 8 can be made of a metallic foil, such as a copper foil, etc. In either of the cases, the tabs 7 and 8 are formed as a strip as illustrated in FIG. 3. Further, one end of the tabs 7 and 8 is bonded to the cathode 4 and anode 5, and the other end thereof is bent by about 90 degrees to extend in a longitudinal direction of the electricity collectors.

The larger the number of the tabs 7 and 8 is, the more favorably current can be taken out. However, too large a number of the tabs 7 and 8 arises troubles in their integration. Suppose one strip-shaped tab 7 and 8 can allow a current of from 2 to 3 A to flow therein, the number of the tabs 7 and 8 falls in a range of from 30 to 50 pieces for each of the cathode 4 and anode 5 which constitute a battery of 100 A capacity.

In the thus constructed tabs 7 and 8, the end bonded to the cathode 4 and anode 5, and an intermediate portion protruding slightly therefrom is hereinafter defined as a linkage member 7A and a linkage member 8A. Whilst, the other end of the tabs 7 and 8, extending in the longitudinal direction of the cathode 4 and anode 5, is hereinafter defined a bundling member 7B and a bundling member 8B. When the cathode 4 and anode 5 are wound spirally, the bundling members 7B and 8B are superimposed in a radial direction of the spirally-wound electricity generator element 3 as illustrated in FIG. 1. As a result, the bundling members 7B and 8B can be bonded integrally. Specifically, a bonding portion 9, where the bundling members 7B and 8B are bonded, is determined at a position where all of the bundling members 7B and 8B are superimposed. As illustrated in FIG. 2, an external terminal plate 10, and an external terminal plate 11 are disposed on both sides of the battery container 2; and the bonding portion 9 of the cathode 4, and the bonding portion 9 of the anode 5 are connected with the external terminal plates 10 and 11, respectively.

The thus constructed battery 1 will be hereinafter described on how it is manufactured. As illustrated in FIG. 3, the electricity collector of the cathode 4 is provided with a non-coated portion 12 on the side continuously or locally. The term, "non-coated portion", hereinafter means a portion of the electricity collector of the cathode 4 and anode 5 which is not coated with an active material. The tabs 7 are attached to the non-coated portion 12. The non-coated portion 12 can preferably be prepared in advance in a coating process of the cathode active material. The tabs 7 can be bonded to the cathode 4 from above the cathode active material. Such an operation, however, is likely to generate dust, and to cause the fear of bonding the tabs 7 to the cathode 4 with decreased bonding strength. Likewise, the anode 5 is coated with the carbon-based anode active material, but is provided with a non-coated portion 13 on the side.

The strip-shaped tabs 7 are bonded to the non-coated portions 12 of the cathode 4. The tabs 7 can be cut to a predetermined length beforehand. Alternatively, the tabs 7 can be made by cutting a tab ribbon when carrying out the bonding operation. The bonding can be carried out by any one of the following processes: an ultrasonic bonding process, a resistance welding process and a crimping process. Among the processes, the ultrasonic process is most preferred, because it is less likely to cause thermal influence, and because it is free from generating dust and it is easy to operate. In view of enlarging the bonding area and reducing the contact resistance, the ultrasonic process is preferred as well. The strip-shaped tabs 8 are similarly bonded to the non-coated portions 13 of the anode 5.

Figure 4:
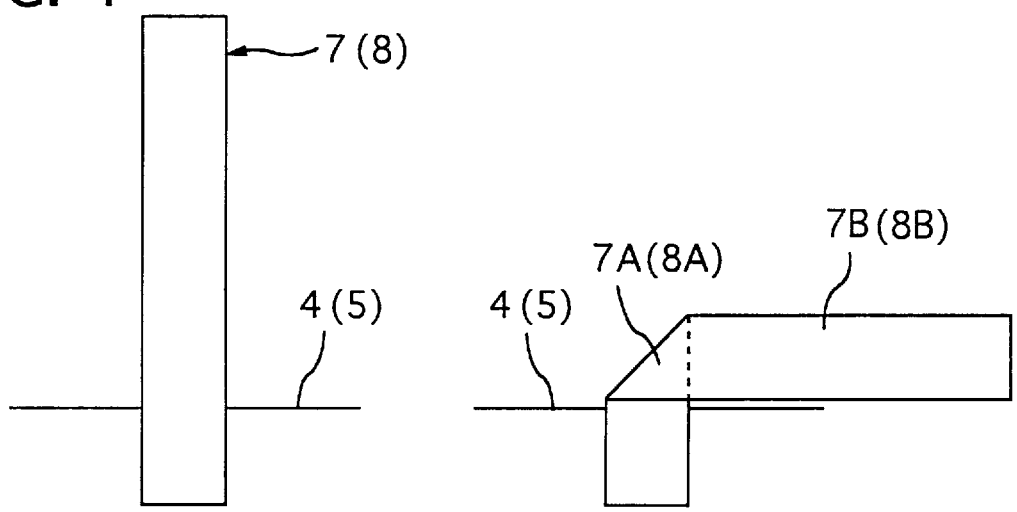
FIG. 4 is an explanatory diagram which illustrates how tabs are bent in accordance with the present invention.
Figure 5:
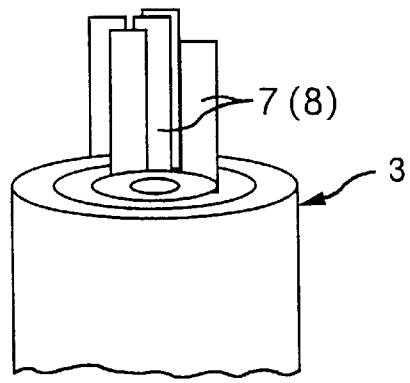
FIG. 5 is an explanatory diagram which illustrates how randomly tabs are disposed, tabs which project from an electricity collector.

As illustrated in FIG. 3, the cathode 4 and anode 5 with the tabs 7 and 8 bonded are wound with a separator 6A and a separator 6B interposed therebetween. The bundling members 7B and 8B of the tabs 7 and 8 are bent as illustrated in FIG. 4, and the linkage members 7A and 8A thereof are positioned at relatively symmetric positions in the longitudinal direction of the cathode 4 and anode 5. The bending of the bundling members 7B and 8B can be carried out before winding the cathode 4 and anode 5 with the tabs 7 and 8 bonded as illustrated in FIG. 3. Alternatively, the bending of the bundling members 7B and 8B can be carried out after winding the cathode 4 and anode 5 with the tabs 7 and 8 bonded as illustrated in FIG. 5. In the bending operation, a predetermined load is applied to the tabs 7 and 8 to plastically deform them so that no spring back occurs at the bending line.

An ordinary winding machine is employed in the winding process. After winding, the bundling members 7B and 8B are bonded integrally at the bonding portion 9. This bonding operation can be carried out by any one of the following processes as well: an ultrasonic bonding process, a resistance welding process and a crimping process. The thus manufactured electricity generator element 3 is accommodated in the battery container 2, and is connected with the external terminal plates 10 and 11 at the bonding portions 9 of the cathode 4 and anode 5.

Figure 6:
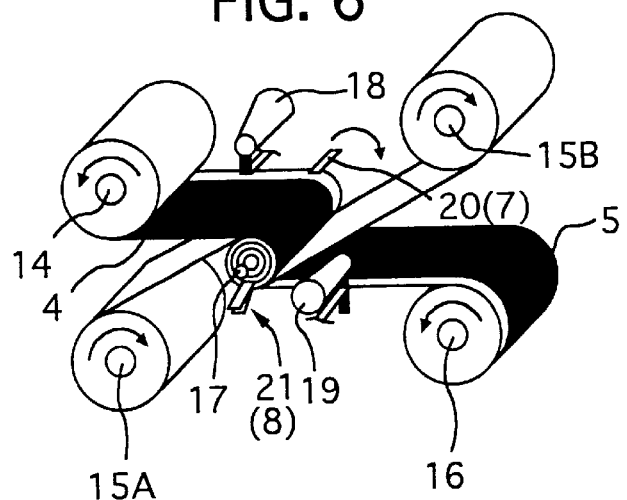
FIG. 6 is a schematic diagram which illustrates how a battery according the present invention is manufactured by using a winding machine provided with a built-in bonding apparatus.

It is not always necessary to independently carry out the bonding process, the bending process and the winding process. For instance, in order to upgrade the positioning accuracy of the tabs 7 and 8 and to improve the working efficiency, these processes can be carried out in series by using a winding machine provided with a built-in bonding apparatus. FIG. 6 is a schematic diagram which illustrates how the bonding process, the bending process and the winding process are carried out in series. As illustrated in the drawing, in a winding machine provided with a built-in bonding apparatus, there are disposed a cathode roller 14, separator rollers 15A and 15B, an anode roller 16, and a platen roller 17. The cathode 4, which has been coated with the cathode active material and provided with the non-coated portion 12, is wound around the cathode roller 14. The separator 6A is wound around the separator roller 15A. The separator 6B is wound around the separator roller 15B. The anode 5, which has been coated with the anode active material and provided with the non-coated portion 13, is wound around the anode roller 16. Moreover, an ultrasonic-phone 18 is disposed in a route along which the cathode 4 is fed out of the cathode roller 14, and an ultrasonic-phone 19 is disposed in a route along which the anode 5 is fed out of the anode roller 16. In addition, a tab ribbon 20 is fed at a position where the ultrasonic wave, produced by the ultrasonic-phone 18, collides with the cathode 4, and a tab ribbon 21 is fed at a position where the ultrasonic wave, produced by the ultrasonic-phone 19, collides with the anode 5.

The attachment of the tabs 7 and 8 is made up of the bonding of the tabs 7 and 8, and the bending thereof. In the winding machine provided with the built-in bonding apparatus, the attachment of the tabs 7 and 8 is carried out in the following steps: bending the tabs 7 and 8, feeding them; bonding them; and cutting them, or alternatively, bending them; cutting them; feeding them; and bonding them. The tabs 7 and 8 are fed by controlling the rotary speed of the cathode roller 14 and anode roller 16, thereby determining the positions of the tabs 7 and 8 with which the ultrasonic wave collides. After one of the bent tabs 7 and 8 is bonded to the cathode 4 and anode 5, the winding of the cathode 4 and anode 5, the termination of the winding machine and the attachment of the tabs 7 and 8 are carried out repeatedly. FIG. 1 illustrates how the electricity generator element 3 is wound up. Due to the influences of the winding tightness, and the like, the attached positions of the tabs 7 and 8 are not aligned as illustrated in FIG. 5. However, when the tabs 7 and 8 are bent, the bundling members 7B and 8B are superimposed in a radial direction so that they can be integrated easily. When the bundling members 7B and 8B are deformed in an arc-like shape in the bending step of the tabs 7 and 8, the bundling members 7B and 8B can be superimposed in a spiral direction.

Figure 7:
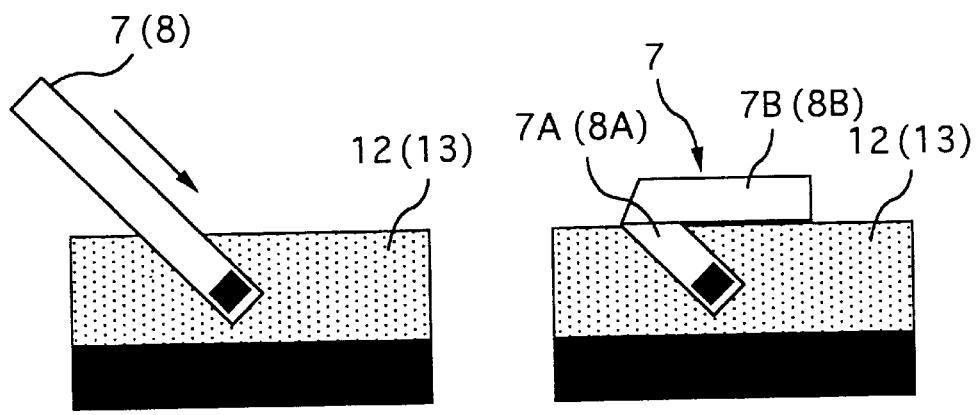
FIG. 7 is an explanatory diagram which illustrates an embodiment on how a tab is bent when the tab is fed obliquely with respect to an electricity collector.
Figure 8:
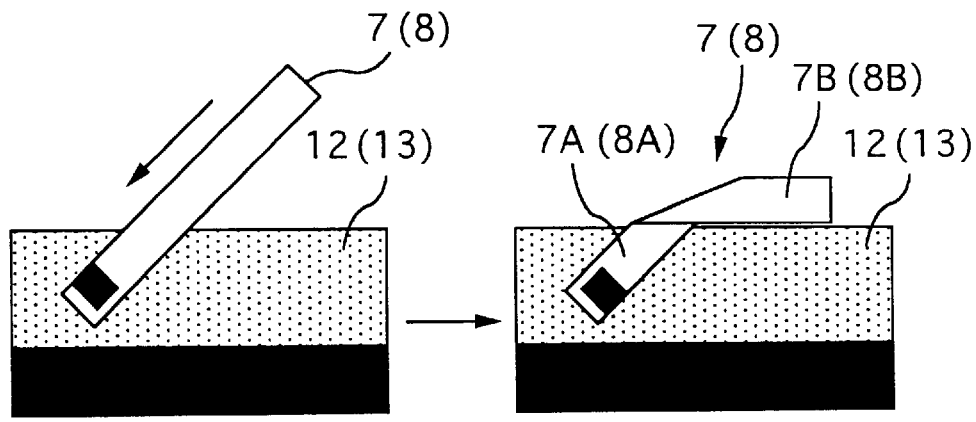
FIG. 8 is an explanatory diagram which illustrates another embodiment on how a tab is bent when the tab is fed obliquely with respect to an electricity collector.

In the manufacturing process described above, the tabs 7 and 8 are fed in a perpendicular direction with respect to the cathode 4 and anode 5. Whilst, when the tabs 7 and 8 are fed obliquely with respect to the cathode 4 and anode 5, the bending angle of the tabs 7 and 8 is adjusted to an acute angle or an obtuse angle in accordance with the feeding angle of the tabs 7 and 8 as illustrated in FIG. 7 or 8.

The angle formed between the bundling members 7B and 8B and the side of the cathode 4 and anode 5 can preferably be close to 0 degree as much as possible. Note that, however, the angle is allowed to fall in a tolerance range of from −20 to +20 degrees approximately.

Figure 9:
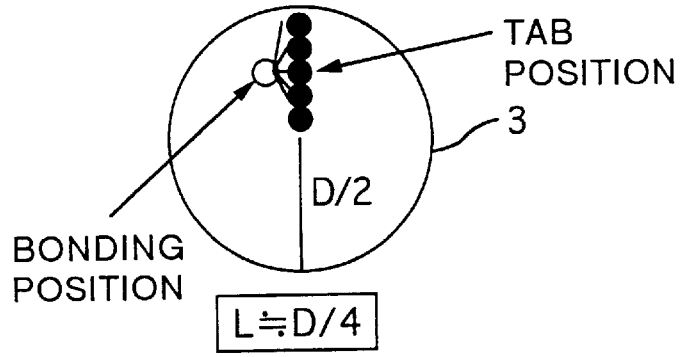
FIG. 9 is an explanatory diagram which illustrates a length required for a bundling member when tabs are aligned without fluctuation.
Figure 10:
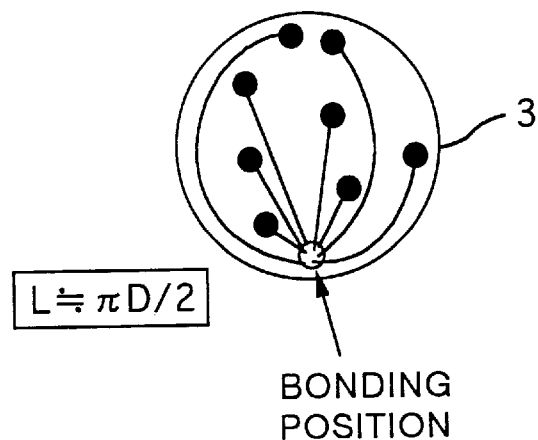
FIG. 10 is an explanatory diagram which illustrates a length required for a bundling member when tabs are placed with maximum fluctuation.
Figure 11:
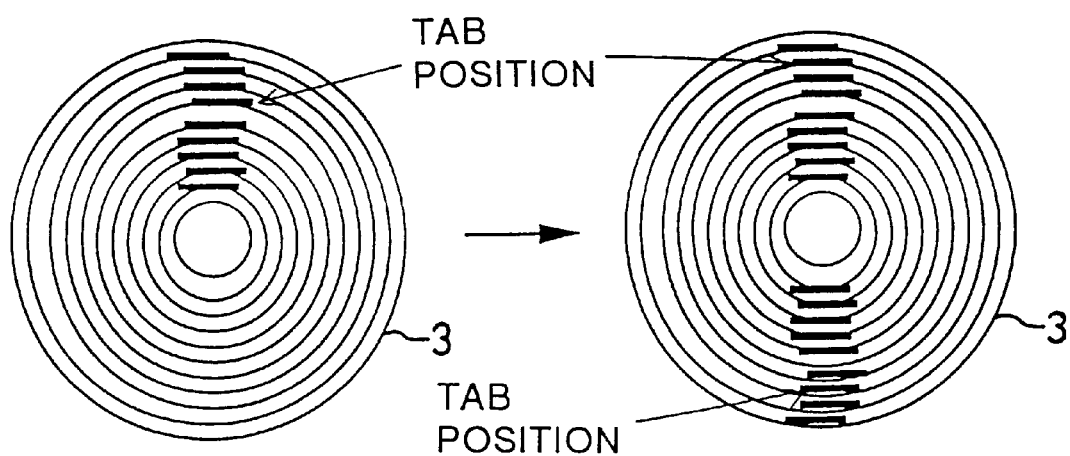
FIG. 11 is an explanatory diagram which illustrates how the positions of tabs are divided into a plurality of groups.

Hereinafter, the length of the bundling members 7B and 8B will be described. As described above, the positions of the tabs 7 and 8 are fluctuated by the influences of the winding tightness, and the like. The fluctuation (i.e., the angular range viewed in the axial direction of the electricity generator element 3 ) lies within a sector angle of about 45 degrees (i.e., θ=45 degrees). The length "L" of the bundling members 7B and 8B depends on the wound-up diameter "D" of the electricity generator element 3 and the fluctuation range (i.e., the sector angle θ) . As illustrated in FIG. 9, "L" can be "D"/4 approximately when the positions of the bundling members 7B and 8B are aligned in a radial direction. On the other hand, as illustrated in FIG. 10, "L" can be π("D"/2) approximately when the positions of the bundling members 7B and 8B are fluctuated over 360 degrees. Thus, the preferred range of "L" can be "D"/ $4 \leq "L" \leq \pi("D"/2)$ with respect to the fluctuation range $0 \leq \theta \leq 360$.

Moreover, the tabs 7 and 8 can be taken out at two locations or more in the circumferential direction of the electricity generator element 3. The positions of the tabs 7 and 8 can be divided into a plurality of groups, for instance, by varying the intervals between the tabs 7 bonded to the non-coated portion 12 (i.e., the side) of the electricity collector constructed as shown in FIG. 3, and by varying the intervals between the tabs 8 bonded to the non-coated portion 13 (i.e., the side) thereof. When taking out the tabs 7 and 8 at two locations in the circumferential direction of the electricity generator element 3, the intervals between the tabs 7, and the intervals between the tabs 8 are adjusted to about a half of the intervals illustrated in FIG. 3. When taking out the tabs 7 and 8 at three locations in the circumferential direction of the electricity generator element 3, the intervals between the tabs 7, and the intervals between the tabs 8 are adjusted to about one-third (⅓) of the intervals illustrated in FIG. 3. When the positions of the tabs 7 and 8 are fluctuated within a relatively small range, the positions of the tabs 7 and 8 thus divided into a plurality of groups can effectively increase the number of the laminated tabs 7 and 8 and enlarge the quantity of the integrally bonded tabs 7 and 8.

Modified Version on Feeding Tabs

As described above, the tabs 7 and 8 can be bent before bonding them. Accordingly, it is possible to use a tab which is bent and cut to a predetermined length in advance.

Figure 12:
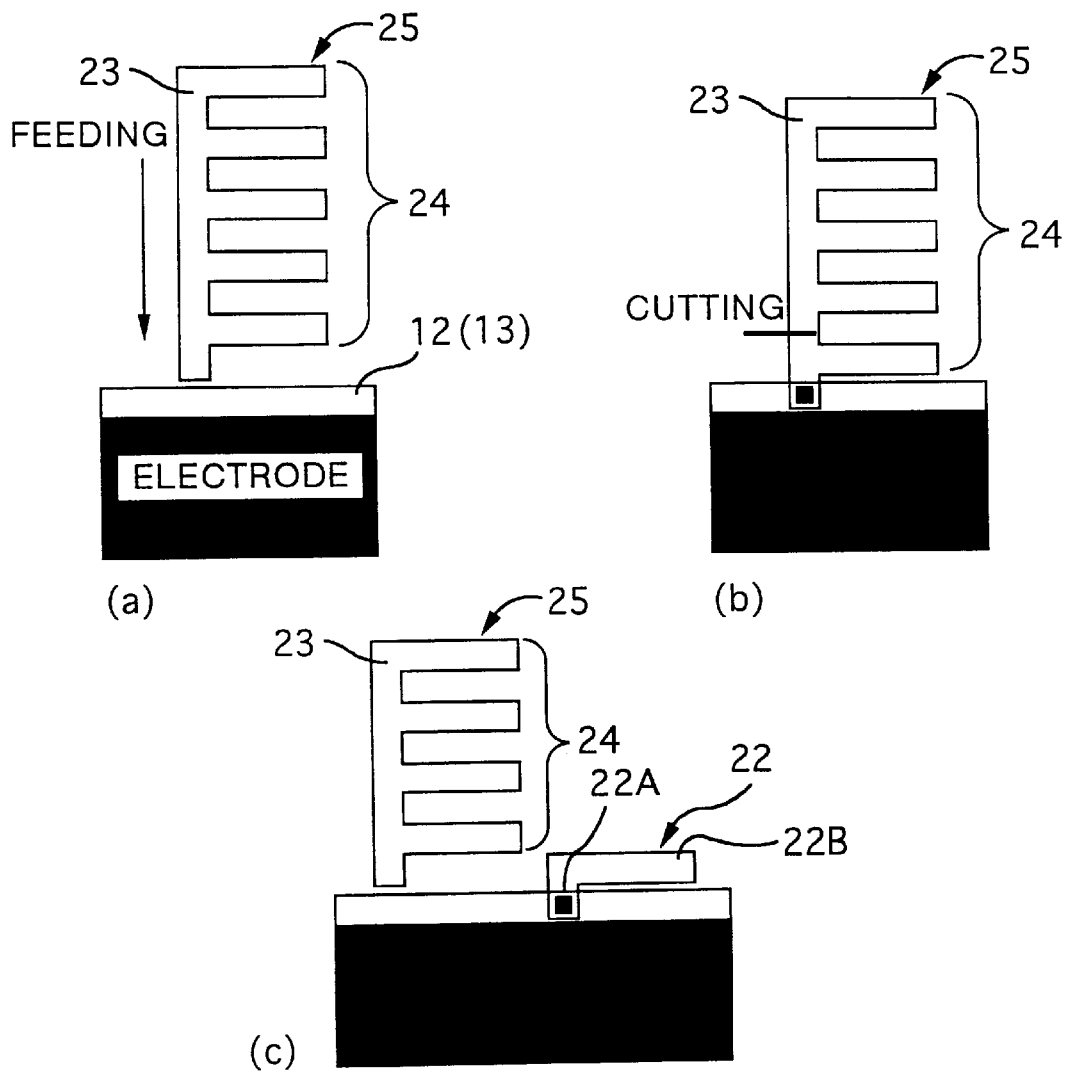
FIGS. 12(a), 12(b) and 12(c) are explanatory diagrams which illustrate how a letter "L"-shaped tab can be cut off from a continuous blank and bonded to an electrode.

Alternatively, instead of the bent tab, a letter "L"-shaped tab can be utilized as well. FIG. 12 illustrates how a letter "L"-shaped tab is fed continuously when bonding tabs. For instance, it is possible to repeatedly bond a letter "L"-shaped tab 22 to the non-coated portion 12 of the cathode 4 by three steps (e.g., (a), (b) and (c)). FIG. 12 (a) illustrates the first step in which a comb-like sheet 25 is fed to a bonding position. The comb-like sheet 25 includes a linkage band 23, and a plurality of bundling bands 24. The linkage band 23 includes a plurality of linkage members 22 A which are disposed in a longitudinal direction of the comb-like sheet 25 in line. The bundling bands 24 are formed integrally with the linkage band 23, are disposed at predetermined intervals, extend from the linkage band 23 in a direction crossing the longitudinal direction of the comb-like sheet 25, and constitute a plurality of bundling members 22B. FIG. 12 (b) illustrates the second step in which one of the linkage members 22A of the linkage band 23 is bonded to the non-coated portion 12 of the cathode 4. Note that, in this step, the linkage band 23 is cut at the end of the subsequent linkage member 22A simultaneously with the bonding of the previous linkage member 22A. FIG. 12 (c) illustrates the third step in which the subsequent linkage member 22A, newly constituting the leading end of the comb-like sheet 25, is bonded and cut at the subsequent bonding position after winding the cathode 4 by a predetermined length. When the three steps are carried out repeatedly, the letter "L"-shaped tabs 22 can be bonded to the non-coated portion 12 of the cathode 4 successively.

Figure 13:
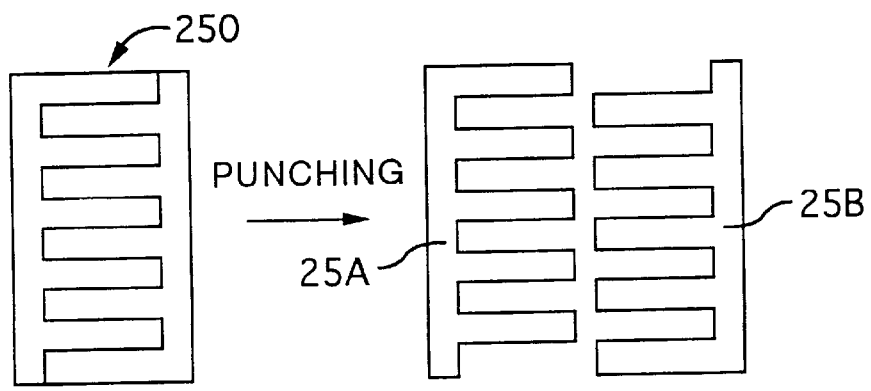
FIG. 13 is an explanatory diagram which illustrates an embodiment on how the continuous blank of FIG. 12 is manufactured.

FIG. 13 illustrates an embodiment on how the comb-like sheet 25 is manufactured. In this embodiment, a band-like sheet 250 is punched out along the cutting line representing the comb-like sheet 25, or is cut therealong by using an energy beam, etc. Thus, two pieces of the comb-like sheets 25A and 25B can be manufactured with ease.

Modified Version on Forming Tabs out of Electricity Collector

Alternatively, the tabs 7 and 8 can be formed without undergoing the above-described bonding process. For instance, as illustrated in FIGS. 14 through 19, an electricity collector is prepared for constituting the cathode 4 and anode 5, and is slit along the side to form the tabs 7 and 8 out of the side. The following can be employed as means for slitting: punching by a pressing machine; ordinary cutting; and cutting by using an energy beam, etc.

Figure 14:
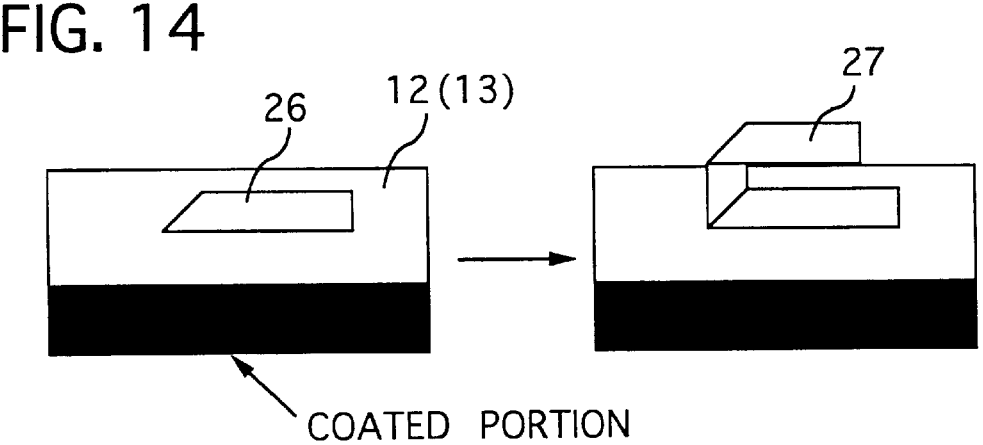
FIG. 14 is an explanatory diagram which illustrates an embodiment on how a tab is formed by slitting an electrode.

FIG. 14 illustrates one of the modified tab-forming processes in which an elongated letter "U"-shaped slit 26 is formed. The thus slit portion is erected, and bent in a zigzag manner to form a slit tab 27.

Figure 15:
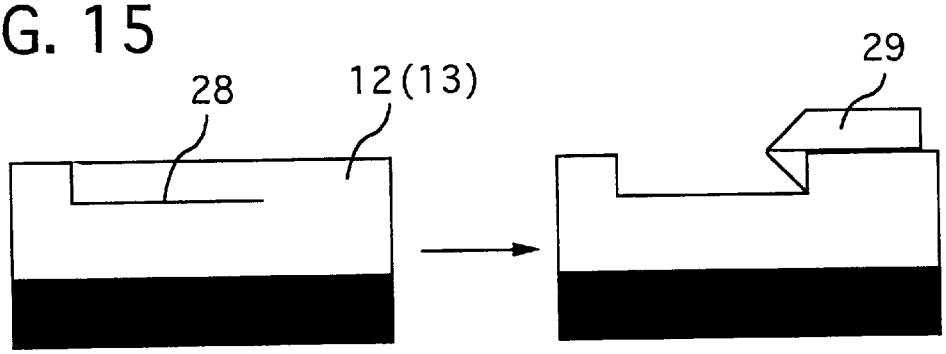
FIG. 15 is an explanatory diagram which illustrates another embodiment on how a tab is formed by slitting an electrode.

FIG. 15 illustrates another of the modified tab-forming processes in which an elongated letter "L"-shaped slit 28 is formed. The thus slit portion is bent to form a slit tab 29.

Figure 16:
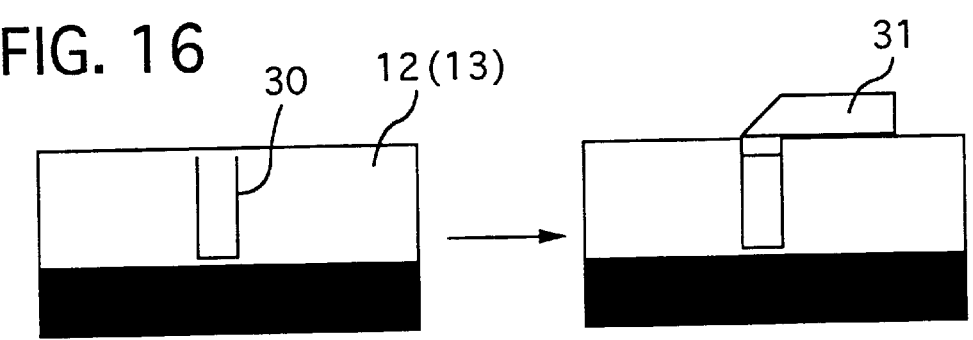
FIG. 16 is an explanatory diagram which illustrates still another embodiment on how a tab is formed by slitting an electrode.

FIG. 16 illustrates still another of the modified tab-forming processes in which an elongated letter "U"-shaped slit 30 is formed in a direction perpendicular to the elongated letter "U"-shaped slit 26 depicted in FIG. 14. The thus slit portion is erected, and bent to form a slit tab 31.

Figure 17:
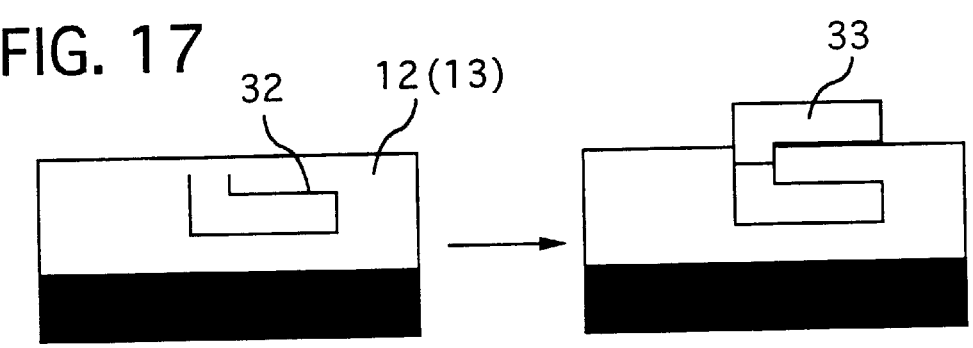
FIG. 17 is an explanatory diagram which illustrates a further embodiment on how a tab is formed by slitting an electrode.

FIG. 17 illustrates further one of the modified tab-forming processes which further modifies the tab-forming process shown in FIG. 14. That is, a slit 32 is formed as an elongated letter "L" shape having a predetermined width. The thus slit portion is bent only once to form a slit tab 33.

Figure 18:
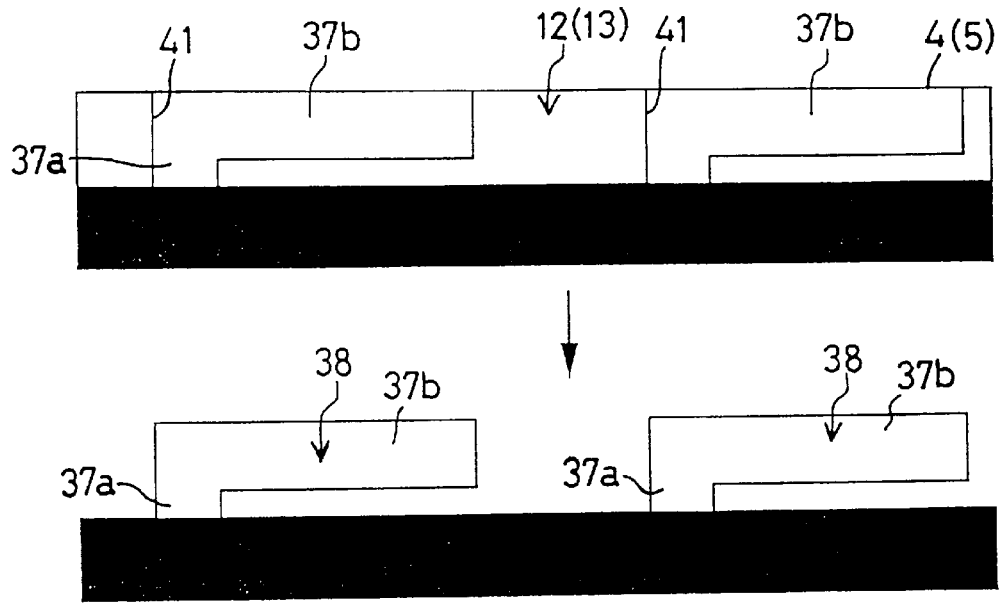
FIG. 18 is an explanatory diagram which illustrates a furthermore embodiment on how a tab is formed by slitting an electrode.

FIG. 18 illustrates furthermore one of the modified tab-forming processes. In the process, a plurality of transverse slits 41 are formed at predetermined intervals in the non-coated portions 12 and 13 of the cathode 4 and anode 5. The slits 41 form a plurality of rectangular portions in the non-coated portions 12 and 13. A plurality of letter "L"-shaped slit tabs 38, which respectively include a transverse linkage member 37a and a lateral bundling member 37b, are formed out of the rectangular portions as follows. Namely, a part of the rectangular portions are removed while leaving the transverse linkage member 37a and the lateral bundling member 37b. The transverse linkage member 37a is a part of the rectangular portions which are connected with the coated portions of the cathode 4 and anode 5. The lateral bundling member 37b is another part of the rectangular portions which are disposed away from the boundary between the non-coated portions 12 and 13 of the cathode 4 and anode 5 and the coated portions thereof by a predetermined distance, and which extend in a longitudinal direction of the cathode 4 and anode 5.

Figure 19:
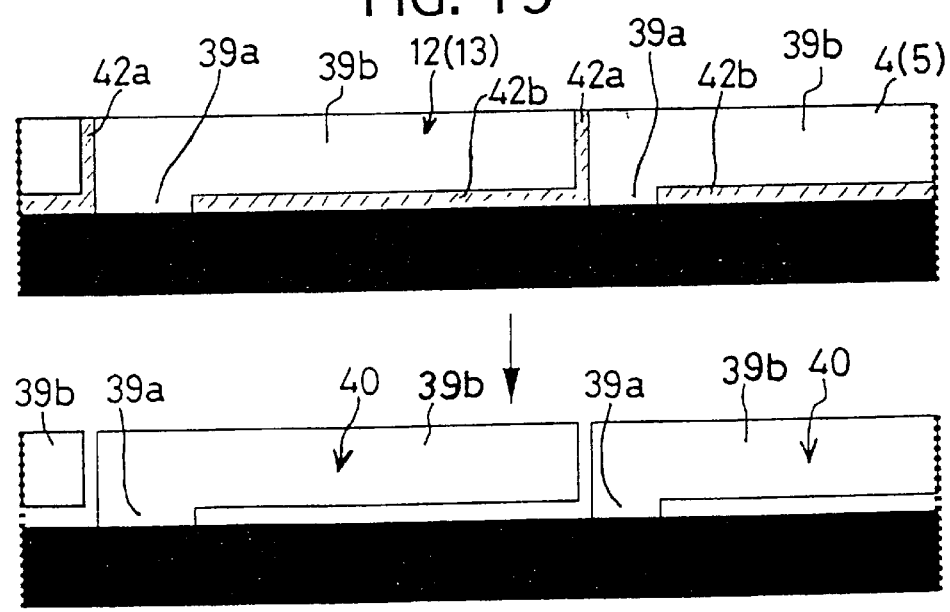
FIG. 19 is an explanatory diagram which illustrates a moreover embodiment on how a tab is formed by slitting an electrode.

FIG. 19 illustrates moreover one of the modified tab-forming processes. In the process, a plurality of slit tabs 40 are formed. The slit tab 40 includes a linkage member 39a and a bundling member 39b. The slit tabs 40 are formed in the following manner: a plurality of transverse slits 42a having a predetermined width are formed in the non-coated portions 12 and 13 of the cathode 4 and anode 5. Note that the transverse slits 42a can be formed as a line; and a plurality of lateral slits 42b having a predetermined width are formed continuously from the transverse slits 42a and along the boundary between the non-coated portions 12 and 13 of the cathode 4 and anode 5 and the coated portions thereof. Thus, the slit tabs 40 are formed out of the remaining non-coated portions 12 and 13 of the cathode 4 and anode 5. This slitting process produces an advantage in that portions to be removed are substantially less in the non-coated portions 12 and 13. In both of the slitting processes shown in FIGS. 18 and 19, punching by a pressing machine, ordinary cutting, and cutting by using an energy beam, etc., can be employed as means for slitting.

Second Preferred Embodiment

Figure 20:
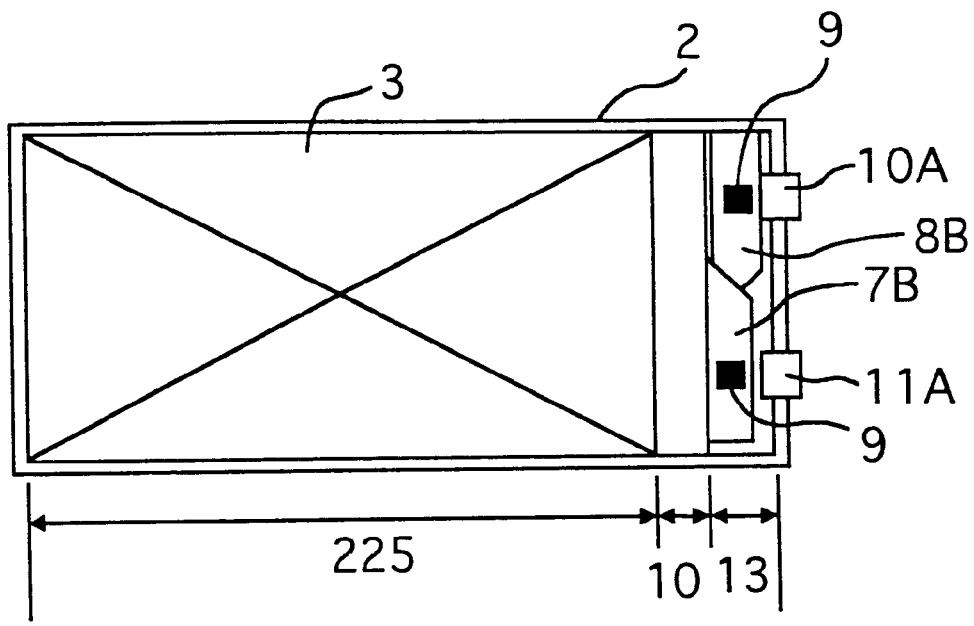
FIG. 20 is a constructional diagram which illustrates a Second Preferred Embodiment of a battery according to the present invention and shows that cathode tabs and anode tabs are projected from one and same side of electricity collectors.

In the First Preferred Embodiment, the tabs 7 and 8 of the cathode 4 and anode 5 are stuck out in opposite directions. Contrary to the First Preferred Embodiment illustrated in FIG. 3, a Second Preferred Embodiment of a battery according to the present invention includes the tabs 7 and 8 which are disposed on and projected from on the same side of the cathode 4 and anode 5. Consequently, as illustrated in FIG. 20, the present invention can be applied to a type of batteries whose external terminal plates 10A and 11A protrude from the same end-surface of the battery container 2. In the Second Preferred Embodiment, the positions of the tabs 7 and 8 fluctuate within about 45 degrees of sector angle in the cathode 4 and anode 5. The tabs 7 and 8 can be integrated by simply bonding the bonding portions 9 which are determined in the bundling members 7B and 8B.

Figure 21:
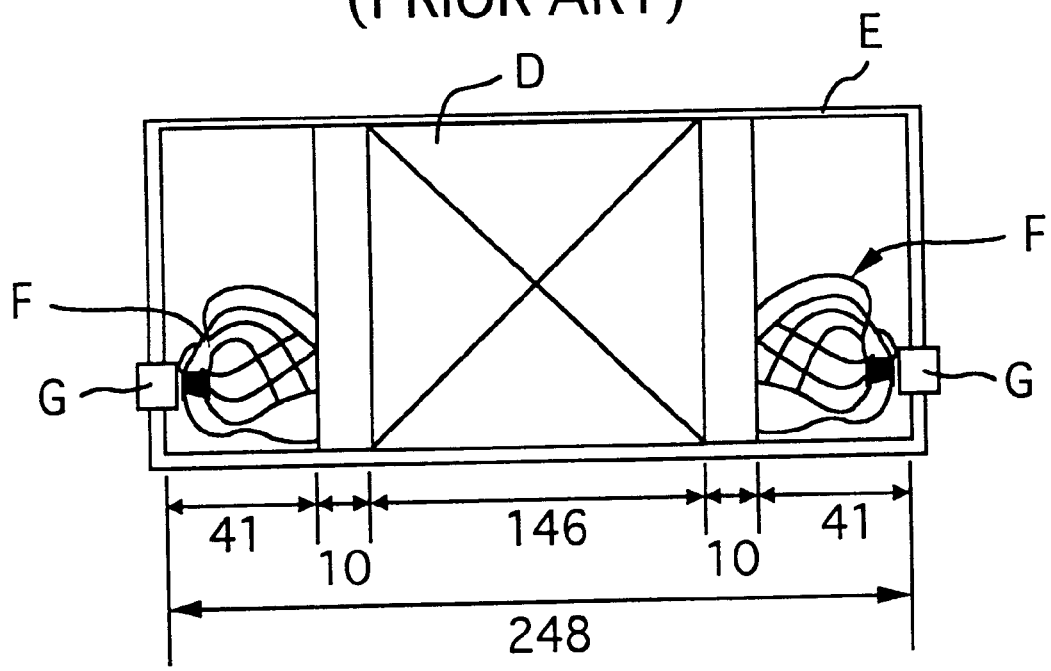
FIG. 21 is a constructional diagram which illustrates a conventional battery.
Figure 22:
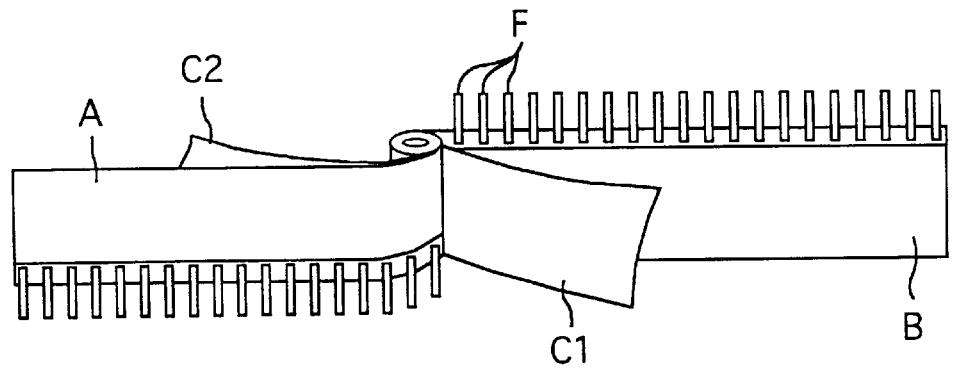
FIG. 22 is an explanatory diagram which illustrates how the conventional battery of FIG. 21 is manufactured.
Figure 23:
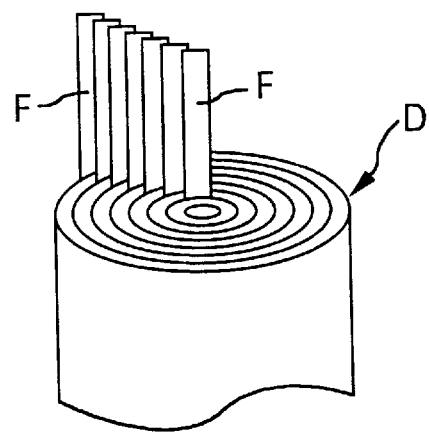
FIG. 23 is a constructional diagram which illustrates an electricity generator element provided with aligned tabs.
Figure 24:
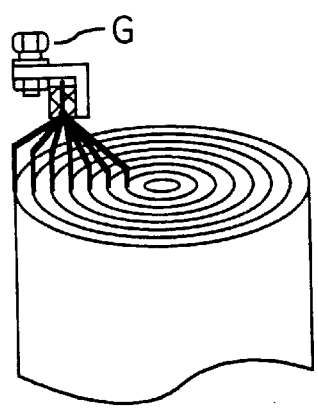
FIG. 24 is a constructional diagram which illustrates how tabs are connected with a terminal plate, tabs which project from an electricity collector.

The First and Second Preferred Embodiments of the present battery, and the conventional battery illustrated in FIG. 21 were compared in terms of the performances as set forth in the "Rated Performance" column of Table 1. As can be appreciated from Table 1, the tabs 7 and 8 are provided for the cathode 4 and anode 5 in a quantity of 30, respectively. The external terminal plates 10 and 11 (or 10A and 11A, or "G") were protruded into the battery container 2 (or "E") by a length of 3 mm. The internal length of the battery 2 container (or "E") was 248 mm. The transverse length of the non-coated portions 12 and 13 of the cathode 4 and anode 5 was 10 mm. The lateral length of the coated portion of the cathode 4 and anode 5 was 600 cm. Thus, the First and Second Preferred Embodiments, and the conventional battery were manufactured under the identical dimensional conditions. Accordingly, the weight density of the battery energy of the conventional battery, and the volume density thereof were taken as the normalization indexes of 1.0, respectively.

In the First Preferred Embodiment as well as the conventional battery, the tabs 7 and 8 of the cathode 4 and anode 5 were projected in the opposite directions, and the cathode 4 and anode 5 were laminated and wound by way of the separators 6A and 6B. In the Second Preferred Embodiment, the tabs 7 and 8 of the cathode 4 and anode 5 were projected in the identical direction, and the cathode 4 and anode 5 were laminated and wound by way of the separators 6A and 6b. Although the positioning of the tabs 7 and 8 were taken into consideration, the tabs 7 and 8 were fluctuated within about 45 degrees of sector angle by the influences of the winding tightness, and the like, in all of the batteries. In the First and Second Preferred Embodiments, the tabs 7 and 8 were bent manually repeatedly after the tabs 7 and 8 are attached in the middle of the winding. The positional relationships of the elements in the batteries, and the dimensions thereof are illustrated in FIGS. 2, 20 and 21, respectively, when the electricity generator elements are wound up, the tabs are bonded integrally with the terminal plates and the electricity generator elements are accommodated in the battery container.

In the conventional battery, every 10 pieces of the tabs "F" were gathered, and each group of the tabs "F" was bonded together by an ultrasonic wave, which means the bonding operation was conducted three times. Then, the three groups of the tabs "F" were integrally bonded to the external terminal plates "G" by using an ultrasonic wave. Note that the bonding of the tabs "F" to the external terminal plates "G" corresponds to the fourth turn of the bonding operations. After completing the bonding process, the space required for integrating the tabs "F" was 41 mm in length in the battery container "E".

On the other hand, in the First Preferred Embodiment, the integration of the tabs 7 and 8 could be carried out with ease. For example, 30 pieces of the tabs 7 and 8 were bonded altogether with the external terminal plates 10 and 11 by one and only bonding step. After completing the bonding process, the space required for integrating the tabs 7 and 8 was merely 13 mm in length in the battery container 2. In accordance with the present invention, the tabs 7 and 8 could be integrated compactly within such a reduced space. As a result, in the Second Preferred Embodiment, the tabs 7 and 8 of the cathode 4 and anode 5 could be bonded on one and the only side of the electricity generator element 3, and could be stuck out in the identical direction as described above.

As can be appreciated from the "Rated Performance" column of Table 1, the First and Second Preferred Embodiments could be provided with the active-material coated portions of enlarged area. As a result, in the First and Second Preferred Embodiments, the battery-energy densities could be enhanced. In particular, the First and Second Preferred Embodiments could be upgraded by 36% and 51%, respectively, with respect to the conventional battery in terms of the volumetric battery-energy density.

TABLE 1

| No. | Rated Performance | Conventional Battery | 1st Pref. Embodiment | 2nd Pref. Embodiment |
|---|---|---|---|---|
| 1 | Number of Tabs on Cathode and Anode | 30 pieces each | 30 pieces each | 30 pieces each |
| 2 | Sticking-out Direction of Tabs | Both sides, Two-way | Both sides, Two-way | One side, One-way |
| 3 | Processing of Tabs | Gathering | Bending | Bending |
| 4 | Positional Fluctuation Range of Tabs (θ) | Approx. 45 deg. | Approx. 45 deg. | Approx. 45 deg. |
| 5 | Number of Bonding Operations for Integrating | 4 | 1 | 1 |
| 6 | Projection Length of External Terminal Plates into Container | 3 mm | 3 mm | 3 mm |
| 7 | Length of Space for Integrating Tabs | 38 mm | 10 mm | 10 mm |
| 8 | Sum of Item Nos. 6 and 7 | 41 mm | 13 mm | 13 mm |
| 9 | Internal Length or Container | 248 mm | 248 mm | 248 mm |
| 10 | Shot-side Length of Non-coated Portion in Cathode and Anode | 10 mm | 10 mm | 10 mm |
| 11 | Short-side Length of Coated Portion in Cathode and Anode | 14.6 cm | 20.2 cm | 22.5 cm |
| 12 | Long-side Length of Coated Portion in Cathode and Anode | 600 cm | 600 cm | 600 cm |
| 13 | Total Area of Coated Portion in Cathode | 8,760 cm$^2$ | 12,120 cm$^2$ | 13,500 cm$^2$ |
| 14 | Enhanced Ratio of Battery-energy Density per Weight | 1.0 | 1.08 | 1.12 |
| 15 | Enhanced Ratio of Battery-energy Density per Volume | 1.0 | 1.36 | 1.51 |

Third Preferred Embodiment

Figure 25:
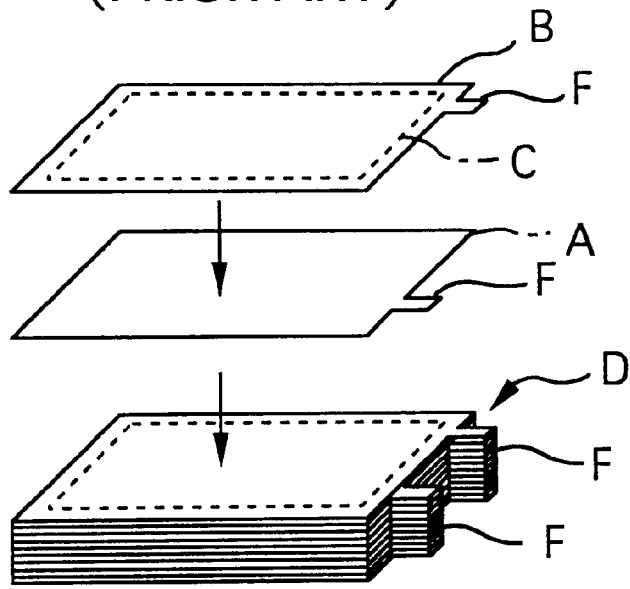
FIG. 25 is a conventional laminated square-shaped battery to which the present invention is applicable.

The present invention is applicable to the laminated square-shaped battery which is constructed by laminating a plurality of square-shaped electricity collectors. The battery of this type was described earlier with reference to FIG. 25, and can be improved by applying the present invention thereto as illustrated in FIG. 26.

Figure 26:
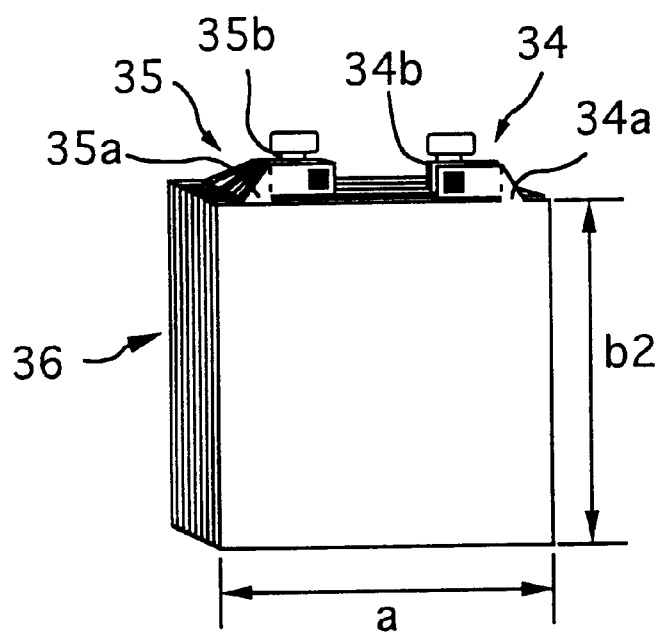
FIG. 26 is an explanatory diagram which illustrates a Third Preferred Embodiment of a battery according to the present invention and depicts how the present invention is applied to the conventional laminated square-shaped battery of FIG. 25.

As shown in FIG. 26, in a Third Preferred Embodiment of a battery according to the present invention, tabs 34 and 35 of the cathode and anode include linkage members 34a and 35a, and bundling members 34b and 35b. The linkage members 34a and 35a are bonded to the square-shaped electricity collectors of the cathode and anode. The bundling members 34b and 35b extend along the side of the square-shaped electricity collectors from which the linkage members 34a and 35a project. Note that the tabs 34 and 35 can be prepared by the processes described in the First Preferred Embodiment.

In the Third Preferred Embodiment of a battery according to the present invention, the electricity collectors of the cathode and anode can be enlarged in terms of the area by the space required for crossing the portions "I" (shown in FIG. 27) of the tabs "F" which project from one side of the electricity collectors in the conventional laminated square-shaped battery. Suppose that the height-wise length of the bundling members 34b and 35b of the electricity generator element 36 (shown in FIG. 26) is equal to the height-wise length of the leading ends "H" of the electricity generator element "D" (shown in FIG. 27), that the width of the electricity generator element 36 and the width of the electricity generator element "D" is "a" and equal with each other, that the height of the electricity generator element 36 is "b2", and that the height of the electricity generator element "D" is "b1" (shown in FIG. 27), each of the electricity collectors of the electricity generator element 36 can be enlarged in terms of the area by the product of "a" and the height difference, "b2"–"b1", (i.e., a(b2–b1)). As a result, it is possible to enhance the energy densities of the Third Preferred Embodiment.

The advantages produced by the First through Third Preferred Embodiments of a present battery according to the present invention are summarized below:

(1) the space required for integrating the tabs with the external terminal plates can be reduced, and accordingly the area of the active-material-coated portions can be enlarged. Thus, the energy densities of the resulting batteries can be enhanced;

(2) the bundling members of the tabs are aligned along the end-surface of the electricity generator element in the width of the tabs. Thus, the bonding operation of the tabs can be carried out by one step;

(3) it is not needed to control the winding tightness with higher accuracy in the manufacture of a battery whose electricity collectors are wound spirally;

(4) it is easy to bond the tabs even when the tabs are projected from one side of the electricity collectors. Moreover, it is possible to remarkably reduce the space required for integrating the one-way-projected tabs with respect to the spaces required for integrating the tabs which are projected from opposite sides of the electricity collectors. Thus, it is possible to enlarge the area of the active-material-coated portion of the electricity collectors;

(5) the size of the battery container can be decreased when the batteries exhibit the same battery-energy densities;

(6) the tabs can be provided for the electricity collectors of the cathode and anode with ease by simply bending them;

(7) even when the tabs are provided with the bundling member in advance, the tabs can be prepared out of the continuous material (i.e., the comb-like sheet) and can be attached to the electricity collectors of the cathode and anode with efficiency;

(8) it is not necessary to prepare a tab ribbon which is specifically adapted for the tabs when the tabs are formed by slitting the parts of the electricity collectors of the cathode and anode. Thus, it is possible to obviate the process for bonding the tabs; and (9) it is possible to reduce the space required for integrating the tabs with the external terminal plates even when the present invention is applied to the laminated square-shaped battery. Thus, the energy densities of the resulting laminated square-shaped battery can be enhanced.

Having now fully described the present invention, it will be apparent to one of ordinary skill in the art that many changes and modifications can be made thereto without departing from the spirit or scope of the present invention as set forth herein including the appended claims.

What is claimed is:

1. A battery, comprising:
   a cathode; and
   an anode;
   at least one of said cathode and anode including:
      an electricity collector having a side and a surface;
      a plurality of tabs having an end projecting from the side of the electricity collector, and being bonded integrally with the electricity collector; and
      an active material formed on the surface of the electricity collector,
      wherein the electricity collector is laminated so as to make an end surface flush on the side of the electricity collector from which the tabs project, and
      each tab comprises:
         a linkage member projecting from the side of the electricity collector, and
         a bundling member formed integrally with the linkage member, extending substantially parallel to the side of the electricity collector from which the tabs project, said bundling member being superimposed on other bundling members, and being bonded with other bundling members.

2. The battery according to claim 1, wherein:
   said electricity collector is band-shaped;
   said tabs are disposed at predetermined intervals in a longitudinal direction of the band-shaped electricity collector; and
   the band-shaped electricity collector is wound so that the side of the band-shaped electricity collector has a flush wound end surface.

3. The battery according to claim 1, wherein:
   said electricity collector is divided into a plurality of parts having an outer periphery; and
   said tabs project from the outer periphery of said parts, said parts having other than a band shape, and being laminated so that the outer periphery has a flush laminated end surface.

4. The battery according to claim 1, wherein:
   said tabs are superimposed on each other at two or more positions.

5. The battery according to claim 1, wherein:
   each tab has a band shape; and
   said tab is bent so as to form said linkage member and said bundling member.

6. The battery according to claim 1, wherein:
   each tab comprises a letter "L"-shaped tab.

7. The battery according to claim 1, wherein:
   each tab comprises a cut-off portion of a comb-shaped sheet, the comb-shaped sheet including:
      a linkage band in which said linkage member is arranged in line in a longitudinal direction; and
      a plurality of bundling bands formed integrally with the linkage band, disposed at predetermined intervals, and extending from the linkage band in a direction crossing the longitudinal direction of the linkage band.

8. The battery according to claim 7, wherein:
   said comb-shaped sheet is made by punching out a square-shaped sheet or by cutting a square-shaped sheet with an energy beam, thereby making two pieces of said comb-like sheets which are used independently as said comb-like sheet.

9. The battery according to claim 1, wherein:

each tab comprises a slit-off part of said side of said electricity collector.

10. The battery according to claim 9, wherein:

each tab comprises a remaining portion of said side of said electricity collector having slits of predetermined width removed at predetermined intervals.

11. The battery according to claim 1, wherein:

both of said cathode and anode include a band-shaped electricity collector;

said tabs are disposed at predetermined intervals in a longitudinal direction of the band-shaped electricity collector; and said tabs of said cathode, and said tabs of said anode are projected from opposite sides of the band-shaped electricity collectors with respect to an axial direction thereof respectively.

12. The battery according to claim 1, wherein:

both of said cathode and anode include a band-shaped electricity collector;

said tabs are disposed at predetermined intervals in a longitudinal direction of the band-shaped electricity collector; and said tabs of said cathode, and said tabs of said anode are projected from one and the same side of the electricity collectors with respect to an axial direction thereof.

13. The battery according to claim 1, wherein said bundling member of each tab is bonded with other bonding members so as to fit within a width of said tabs.

* * * * *

UNITED STATES PATENT AND TRADEMARK OFFICE
CERTIFICATE OF CORRECTION

PATENT NO.     : 6,106,975
DATED          : August 22, 2000
INVENTOR(S)    : Goro Watanabe, et al.

Page 1 of 1

It is certified that error appears in the above-identified patent and that said Letters Patent is hereby corrected as shown below:

Column 16, (Claim 3)
Line 42, after "having" please insert --a shape--;

Column 16, (Claim 8)
Line 66, delete "is made by punching out a";
Line 67, change "square-shaped sheet or by cutting" to --comprises one of a punched-out portion and a cut-out portion of--.

Column 17, (Claim 8)
Lines 1-3, delete in their entirety.

Signed and Sealed this

Third Day of July, 2001

Attest:

NICHOLAS P. GODICI
Attesting Officer — Acting Director of the United States Patent and Trademark Office